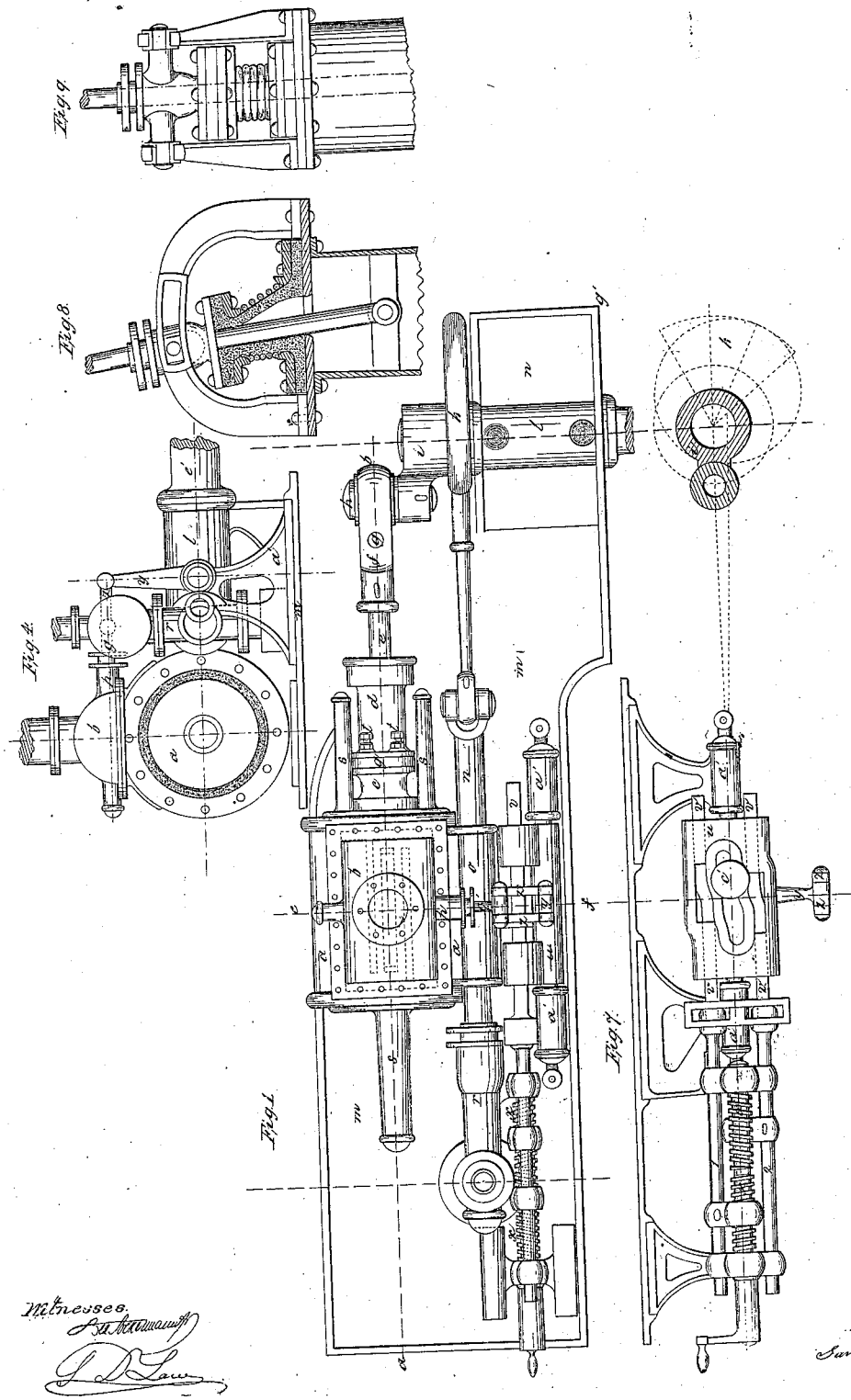

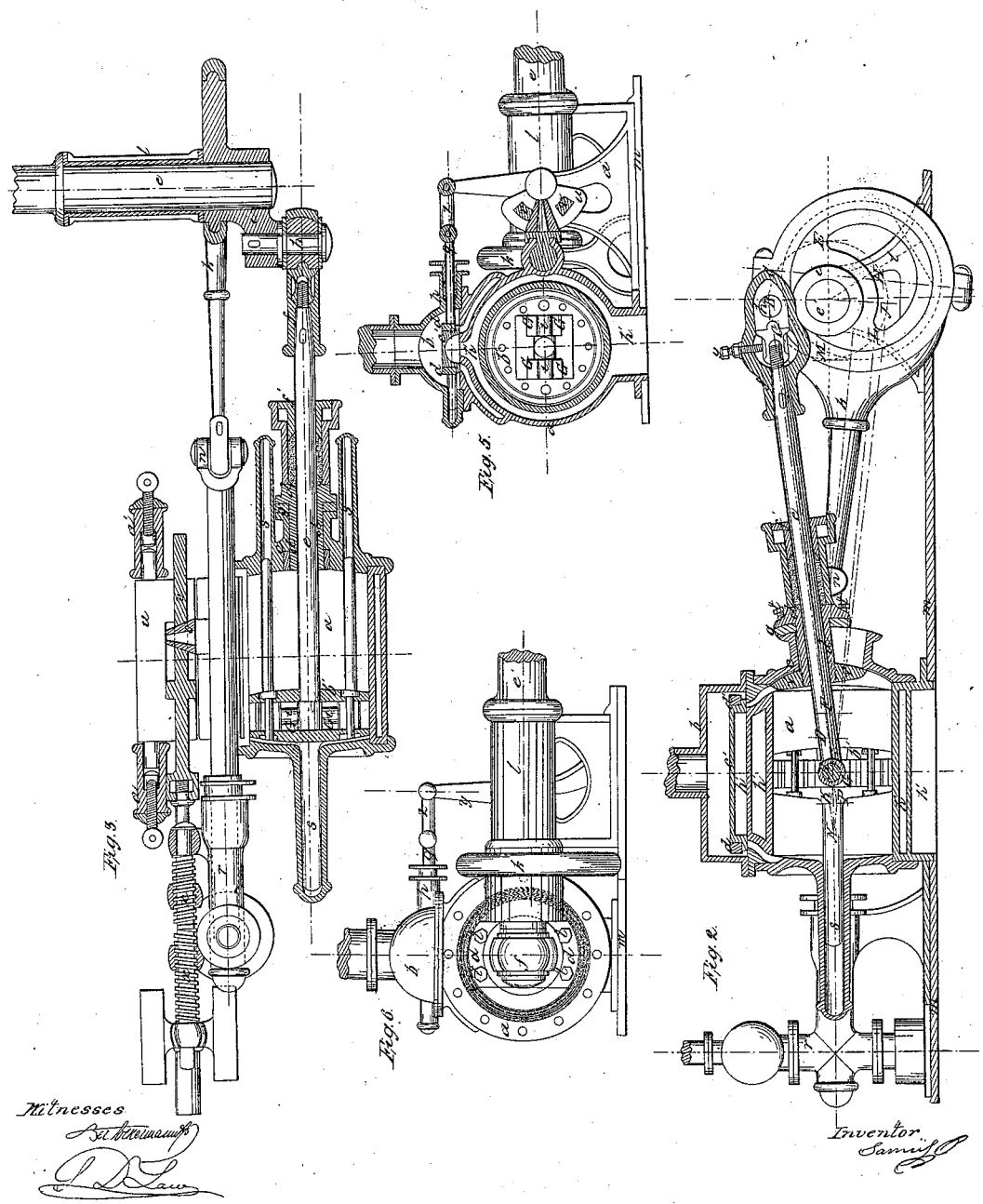

UNITED STATES PATENT OFFICE.

A. P. SAMUËL, OF NEW YORK, N. Y.

PISTON AND PISTON-ROD CONNECTION.

Specification of Letters Patent No. 19,722, dated March 23, 1858.

*To all whom it may concern:*

Be it known that I, AUGUSTIN PETER SAMUËL, of New York, in the county of New York, in the State of New York, have invented a new and Improved Method of Connecting the Piston-Rods of Steam-Engines to the Crank by a Direct Connection; and I do hereby declare that the following is a full, clear, and exact description thereof, reference being had to the accompanying drawings and to the letters of reference marked thereon.

The nature of my invention consists in a new arrangement of parts, for transmitting motion directly from the piston rod to the crank by causing the piston rods to move through an inner and outer cover of the cylinder, upon a curve taken from the center of the cylinder, such piston rod being connected to the piston by an axle, resting in sliding boxes, sliding in the interior of the piston, so as to admit a small deviation of the rod from the center line of the piston to allow the regular movement of the machine.

To enable others skilled in the art to make and use my invention, I will proceed to describe its construction and operation.

Figure 1. general plan of such invention or arrangement. Fig. 2. vertical section through $a—b$ of Fig. 1. Fig. 3. horizontal section through $c—d$, of Fig. 1. Fig. 4. vertical view taken at $c—d$, of Fig. 1. Fig. 5. transverse section taken at $e—f$, of Fig. 1. Fig. 6. vertical view taken at $g—h$, of Fig. 1. Fig. 7. general view of a variable cutoff, detached from the machine, but intended to be used in connection with it, and for which a separate application for Letters Patent has been made. Figs. 8. 9. show an arrangement which may be used in place of the semi rotative piece $d$, being an india rubber tube surrounded with metallic wire, such tube fixed on one end to the cover of the cylinder, and at the other end to a stuffing box oscillating on two slides. This arrangement differs from the other, that the center or point of the piston rod, which is hinged and slides in the interior of the piston, in this only hinges but does not slide nor deviate from the center line, as the india rubber tube, by its elasticity, stretches according the way the piston rod describes. This arrangement I do not however intend to protect in this application, and only refer to it, for the purpose of illustration, leaving it as the subject matter of a separate application, if hereafter deemed advisable.

$a$, steam cylinder—$b$, steam box—$c$, cover of the cylinder with a semirotative form—$d, d, d$, movable box or frame, surrounding the piston rod, and fitting as closely as possible, to allow the backward and forward motion, and extending from the outer to the inner cover of the cylinder, and having fixed to its inner end the piece $x'$, which fits closely against the inner cover of C. $e$, piston rod used as a connecting rod, moving on an axle in the piston $b'$. $f$, head of the connection. $g$, vise preventing the screw nut from becoming loose. $h$, pin of the crank. $i$, crank. $k$, eccentric. $l$, a support for the shaft. $m$, foundation plate. $n$, rod working the conical knob $o'$ of the variable cut-off, and the piston of the water pump. $o$, guide of the rod $n$. $p$, stuffing box of the rod $q$, which works the slide valve. $r$, water pump. $s, s, s$, steam piston guides. $t, t$, vises serving to regulate the movable box $d$. $u$, frame of the helical curves composing the variable cut-off. $v$, helical curves of the variable cut-off and moved by the vises $x, x$. $y$, lever fixed to the frame $u$, to move the rod $g$. $g'$, intermediate sliding pieces to regulate the movable box $d$. $o$, conical knob of the eccentric. 1, 2, guides of the helical curves $v, v$. $b'$ steam piston. $c'$, distributing slide valve. $d', d'$, iron frame surrounding the slide valve $c'$. $e'$, shaft of the machine. $f'$, stuffing or press about the piston $e$. $h', h', h'$, escapements of steam. $i'$, axle of the inner end of the piston rod.

The lines in red ink indicate the motion. The crank being at the point B, the piston $b,'$ is in the middle of the stroke and in the center of the cylinder, and the center or point A of the piston rod is in the middle of the piston. When the knob of the crank passes from B, to C, the piston and consequently the point or center A, will move to D, producing a slight deviation from the center line, by means of the slides G, G, in the interior of the piston $b'$,—then when the knob of the crank moves from C, to E, the point or center A, will pass from D, to F, and will thus be placed again on the center line, and in this position the crank will be at its dead point. In the retrograde movement, the knob of the crank moves from E, to H, and the center A, which is at F, will have moved to I, and thus will deviate the same quantity to the opposite side of such center line. The crank continuing to move from H, to J, the center A, will have returned from I, to the point A, of departure. For the other part of the stroke the crank will move from J, to L, and the center A, will pass from A, to K. The crank having moved from L, to M, will be at its second dead point, and the center A, will have moved from K, to N, and to finish the stroke, the crank will pass by the point O, and return to B, the point of departure, and at the same time the center A, will have passed from N, to P, and returned to the point A,—thus the stroke will be made. The same movement will take place for the reverse action. In this mode of action of the mobile piston rod, it will be observed that the movable box or frame $d$, slides through the inner and outer parts of the cover C, from a center taken at A, in the piston $b'$, carrying with it the part $x'$, $x'$, which keeps the cylinder constantly tight. As the piston $b'$, is not stationary but moves backward and forward in the cylinder, the arrangement of the movable boxes or axle in the piston is necessary so as to allow a variation in the position of the center A, to correspond to the movement of the piston, else the parts would bind and break. If the piston was stationary, the point A, could be fixed also but because such piston is movable the point or center A, must be variable as described.

The movable box or frame $d$, and the point $x'$ constitute in reality but one or a single part, though made of different pieces. That part of $d$, which surrounds the piston rod, screws or locks into the curved part $x'$ and this is drawn close against the inner cover of C, by means of the vises or screws $t$, $t$, acting against the intermediate sliding pieces or rings $g'$. The object and effect of the parts $d$, $x'$, is to support the piston rod, and hold it firm, and prevent it having any motion, other than the sliding or reciprocating, and the vibrating or oscillating ones, before mentioned, and renders necessary the movable boxes in the piston, or some equivalent arrangement there, to allow or permit the deviation of the piston rod from the longitudinal center line of the cylinder. In all cases in which there is a direct connection of the piston rod with the crank, there must be some arrangement or position of the parts so as to permit such deviation, or the different parts would be broken. Where the connection between the piston and piston rod is a fixed point, this deviation must be provided for or permitted by some arrangement of parts, on the covers of the cylinder, as by the spherical ball about the piston rod in the engine of Gustafson. If however the piston rod where it passes through the cylinder covers is prevented from having any motion other than its reciprocating and oscillating motions, then the point of connection between the piston and its rod must be movable, for the purposes of such deviation; hence the axle of the piston rod is made to rest on the movable boxes G, G, for such purpose. These allow the necessary deviation of the piston rod, the center line of which however continually passes through the center of the cylinder.

In the drawings the part $d$, $x'$, is shown as extending up so as to include the stuffing box $f$. but this is not necessary, as these are distinct in their purposes. The part $x'$, acts also as a valve to render the cylinder tight.

This direct connection of the rod to the crank may be applied to different engines, pumps, blowing machines &c.

I do not claim generally transmitting motion from a fixed cylinder direct to the crank without intermediate connections, by means of an oscillating piston rod but

What I claim as my invention and desire to secure by Letters Patent is—

A direct connection of the piston rod to the crank, with a fixed cylinder, by the use, or by means of, the arrangement of the movable boxes G, G, in the piston, forming the connection between the piston and piston rod, in combination or connection with the part $d$, $x'$, moving upon the curved covers of the cylinder, the whole arranged substantially as, and for the purposes set forth and described.

A. P. SAMUËL.

Witnesses:
BER. ACKERMANN, Jr.,
S. D. LAW.